United States Patent
Onishi

(10) Patent No.: US 9,935,431 B2
(45) Date of Patent: Apr. 3, 2018

(54) POWER SUPPLY IDENTIFICATION APPARATUS AND POWER SUPPLY IDENTIFICATION METHOD

(71) Applicant: Panasonic Intellectual Property Management Co., Ltd., Osaka (JP)

(72) Inventor: Haruka Onishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 274 days.

(21) Appl. No.: 15/007,581

(22) Filed: Jan. 27, 2016

(65) Prior Publication Data

US 2016/0141844 A1    May 19, 2016

Related U.S. Application Data

(63) Continuation of application No. 13/408,241, filed on Feb. 29, 2012.

(30) Foreign Application Priority Data

Jun. 23, 2011 (JP) .................. 2011-139083

(51) Int. Cl.
  *G06F 1/26* (2006.01)
  *H02B 1/24* (2006.01)
(52) U.S. Cl.
  CPC ............... *H02B 1/24* (2013.01); *G06F 1/26* (2013.01); *G06F 1/263* (2013.01); *Y10T 307/74* (2015.04)
(58) Field of Classification Search
  CPC .......................................... G06F 1/26
  USPC .......................... 307/72, 75, 85-86
  See application file for complete search history.

(56) References Cited

U.S. PATENT DOCUMENTS

| | | |
|---|---|---|
| 4,980,577 A | 12/1990 | Baxter |
| 6,118,807 A | 9/2000 | Warren et al. |
| 6,122,181 A | 9/2000 | Oughton, Jr. |
| 6,320,442 B1 | 11/2001 | Sindalovsky |
| 6,420,906 B1 | 7/2002 | Kohda |
| 6,744,151 B2 | 6/2004 | Jackson et al. |
| 6,987,333 B2 | 1/2006 | Winick et al. |
| 7,205,681 B2 | 4/2007 | Nguyen |
| 7,242,565 B2 | 7/2007 | Yoshio |
| 7,379,282 B1 | 5/2008 | Zansky |
| 7,466,573 B2 | 12/2008 | Kojori et al. |
| 7,506,186 B2 | 3/2009 | Takeuchi et al. |
| 7,671,489 B1 | 3/2010 | Uy et al. |

(Continued)

FOREIGN PATENT DOCUMENTS

| | | |
|---|---|---|
| JP | 5-241696 | 9/1993 |
| JP | 2005-063355 | 3/2005 |

*Primary Examiner* — Adi Amrany
(74) *Attorney, Agent, or Firm* — Wenderoth, Lind & Ponack, L.L.P.

(57) ABSTRACT

Provided is a power supply identification apparatus including circuitry including a first input terminal, a second input terminal and an output terminal which outputs a driving voltage to an electric device, and a power supply identification section which (i) determines from which of a first power supply and the second power supply a power is being input based on a relationship between an input timing of a first voltage to the first input terminal and a second voltage to the second input terminal, and (ii) switches the driving voltage output from the output terminal according to the power supply the power is being input from to control an initial ON/OFF state of the electric device.

8 Claims, 9 Drawing Sheets

(56) References Cited

U.S. PATENT DOCUMENTS

2005/0088931 A1    4/2005   Takeuchi et al.
2009/0172472 A1    7/2009   Sun et al.
2009/0243390 A1   10/2009   Oto
2010/0265628 A1   10/2010   Blinder et al.

Fig.9
(1)
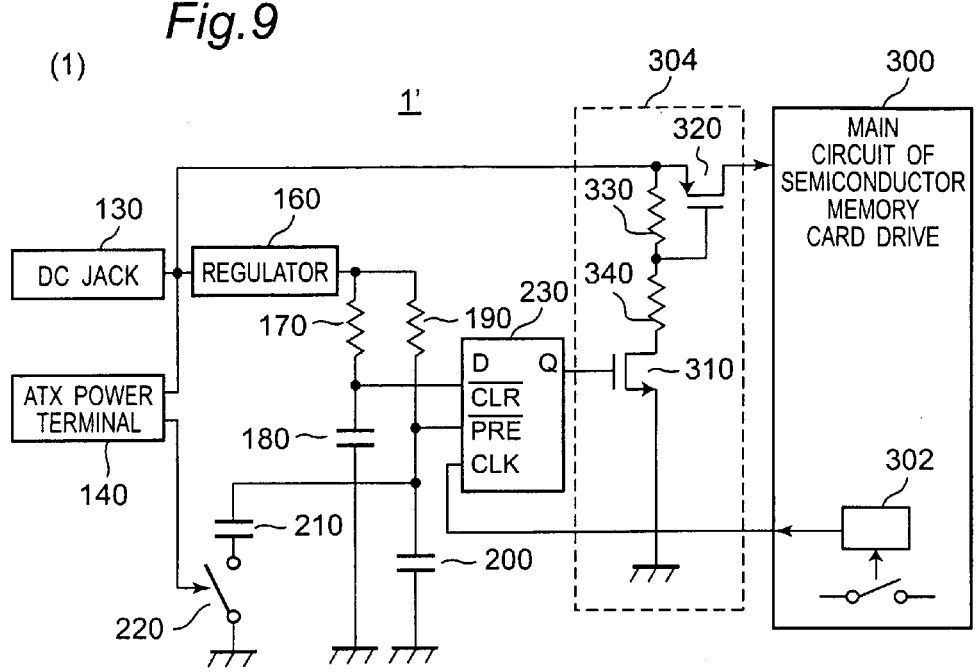
(2)
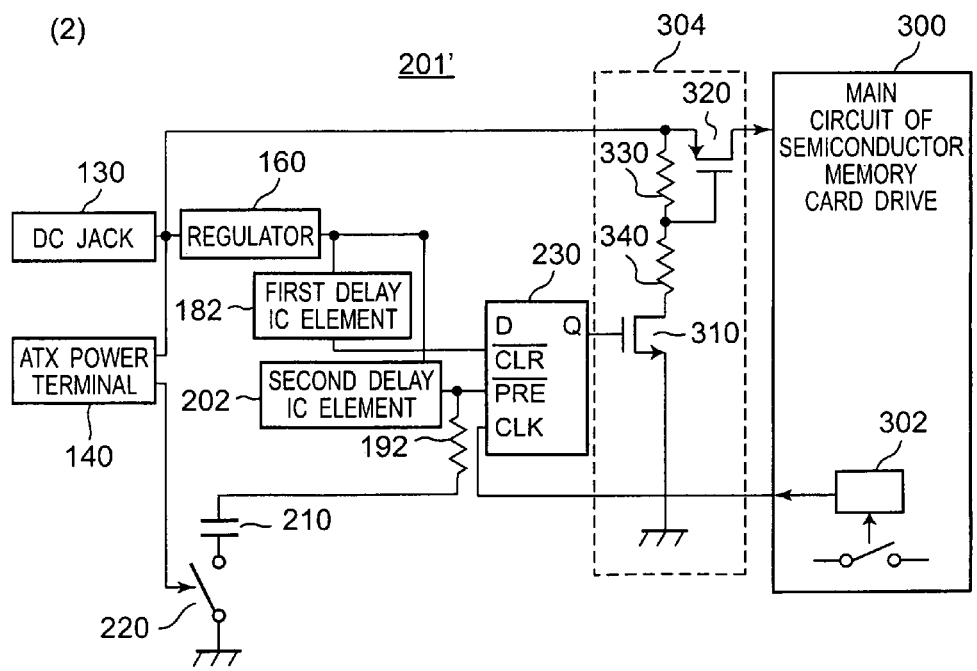

POWER SUPPLY IDENTIFICATION APPARATUS AND POWER SUPPLY IDENTIFICATION METHOD

BACKGROUND

1. Technical Field

The present invention relates to a power supply identification apparatus in an electric device having two kinds of power input terminals, for controlling an initial ON/OFF state corresponding to the type of power supplies.

2. Related Art

Some data storage devices such as hard disc devices can be built in personal computers and are attached externally to personal computers to be operated. In general, powers of such data storage devices built in the personal computers are supplied from personal computer main bodies, and powers of the external data storage devices are supplied from AC power supplies.

Such data storage devices are activated by powers supplied from personal computer main bodies or AC power supplies. That is to say, when the data storage devices are built in the personal computers, power switches of the personal computer main bodies activate the data storage devices. In this case, however, both power switches of the personal computer main bodies and power switches of the data storage devices should be turned on. On the other hand, when the data storage devices are externally attached to the personal computers, the data storage devices are activated by supply from the AC power supplies. Needless to say, also in this case, power switches of the data storage devices should be turned on.

Japanese Patent Application Laid-Open No. 05-241696 discloses a technique that detects connection/disconnection of the AC power immediately when an AC adapter (AC power) is pulled out and further is connected after a personal computer is activated. However, the personal computer disclosed in Japanese Patent Application Laid-Open No. 5-241696 does not control ON/OFF states of peripheral devices such as the data storage device according to types of power supplies to be connected, for example, types of AC power supplies and another power supplies.

Conventionally, an electric device having two kinds of different power input terminals such as a data storage device can detect connection/disconnection of a power supply to the respective power input terminals and select any one of power supplies to be used. However, the electric device cannot be activated nor prevent activation according to a type of the power input terminal to which the power is currently supplied.

It is an object of the present invention to provide a power supply identification apparatus that can automatically identify a power of two kinds of powers that is input, and can control an ON/OFF state of activation in an entire electric device according to the type of the input power.

SUMMARY

In order to solve the above problem, a power supply identification apparatus according to the present invention includes a first power terminal to which a first power supply is connected, a second power terminal to which a second power supply is connected, an output terminal, a voltage switching section having a first input terminal and a second input terminal for switching an output voltage of the output terminal into a first voltage representing that the first power supply is connected to the first power terminal or a second voltage representing that the second power supply is connected to the second power terminal according to an input order of signals into the first input terminal and the second input terminal, a first delay section for delaying a voltage supplied via the first power terminal or the second power terminal by a first delay time so as to output the voltage to the first input terminal, a second delay section for delaying a voltage supplied via the first power terminal or the second power terminal by a second delay time shorter than the first delay time so as to output the voltage to the second input terminal, and a delay time switching section for switching the second delay time into a third delay time longer than the first delay time based on a power supply to the second power terminal.

Further, a power supply identification method of the present invention in a power supply apparatus having a first power terminal to which a first power supply is connected, a second power terminal to which a second power supply is connected and an output terminal, includes a first delay step of delaying a voltage supplied via the first power terminal or the second power terminal by a first delay time so as to output the voltage to a first input terminal, a second delay step of delaying the voltage supplied via the first power terminal or the second power terminal by a second delay time shorter than the first delay time so as to output the voltage to a second input terminal, a switching step of switching an output voltage of the output terminal into a first voltage representing that the first power supply is connected to the first power terminal or a second voltage representing that the second power supply is connected to the second power terminal according to an input order of signals into the first input terminal and the second input terminal, and a delay time switching step of switching the second delay time into a third delay time longer than the first delay time based on the power supply to the second power terminal.

The power supply identification apparatus of the present invention can control an ON/OFF state of activation in an entire electric device according to whether a power is supplied from one of or the other of the two kinds of the different power input terminals.

BRIEF DESCRIPTION OF DRAWINGS

FIG. 9 is a circuit diagram illustrating the power supply identification apparatus incorporated into the semiconductor memory card drive, according to a third embodiment of the present invention.

DETAILED DESCRIPTION OF PREFERRED EMBODIMENTS

Preferred embodiments of the present invention will be described below with reference to the drawings. A semiconductor memory card drive is used as one example of an electric device having a power supply identification apparatus.

First Embodiment 1.1. Configuration of Connection between Semiconductor Memory Card Drive and Personal Computer A configuration of a connection between the semiconductor memory card drive and a personal computer (hereinafter, PC) will be described. A semiconductor memory card drive 110 can be built in or externally attached to the PC 100 so as to be used.

Figure 1:
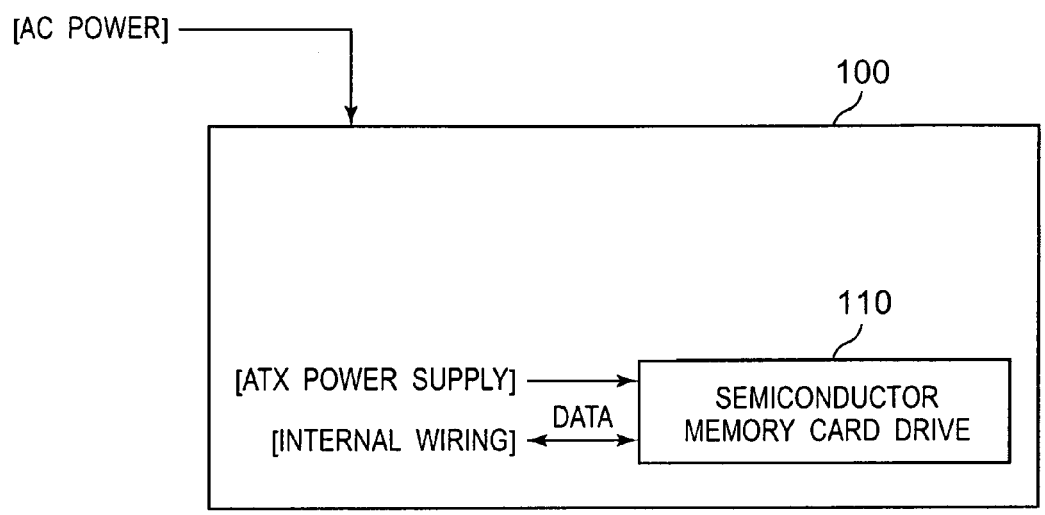
FIG. 1 is a pattern diagram illustrating a state that a semiconductor memory card drive into which a power supply identification apparatus is incorporated is used in a PC built-in mode, according to a first embodiment of the present invention.

FIG. 1 is a pattern diagram illustrating a state of a use in a mode such that the semiconductor memory card drive 110 is built in the PC 100 (built-in mode). The semiconductor memory card drive 110 is built in the PC 100 so as to be integral with the PC 100. When the semiconductor memory card drive 110 is built in the PC 100, the semiconductor memory card drive 110 is connected to the PC 100 by an ATX (Advance Technology Extended) power supply, and a power is supplied to the semiconductor memory card drive 110 from the PC 100. A power is supplied to the PC 100 by an AC power (commercial power supply). Further, the semiconductor memory card drive 110 exchanges various data with the PC 100 via an internal wiring.

Figure 2:
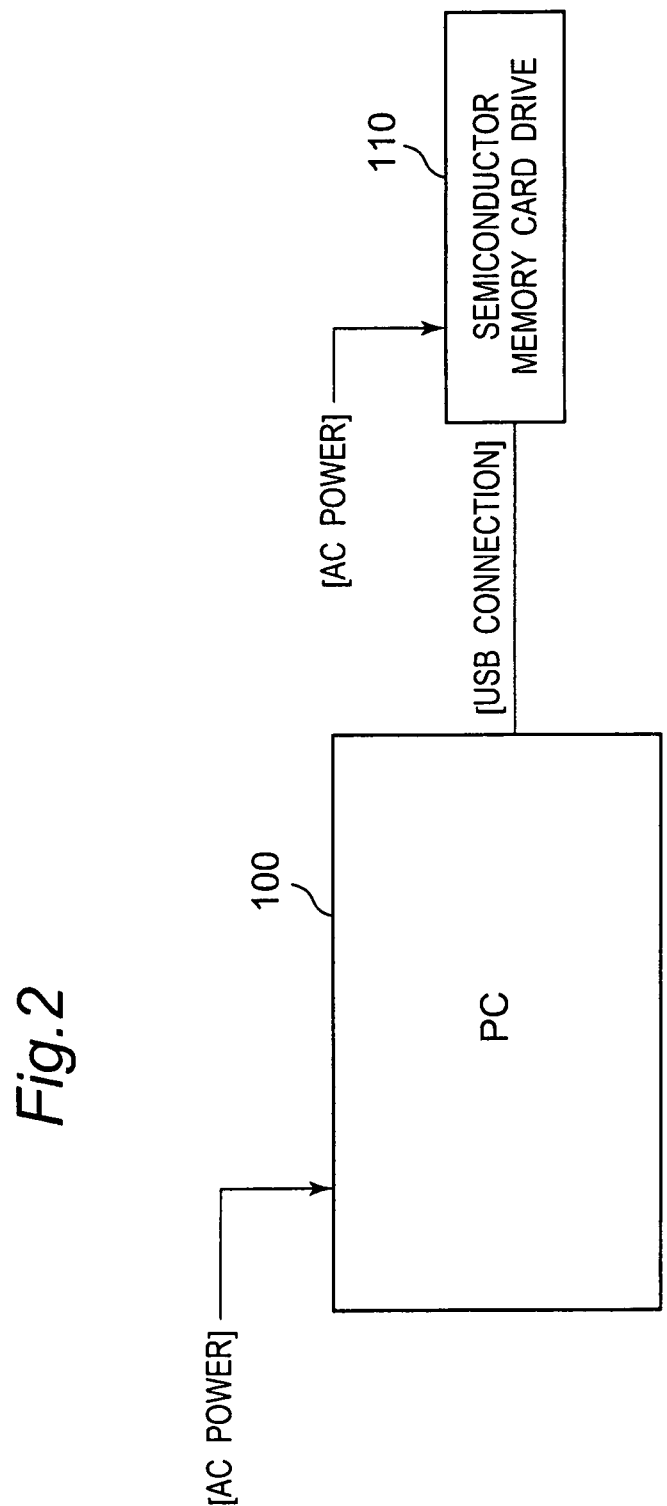
FIG. 2 is a pattern diagram illustrating a state that the semiconductor memory card drive into which the power supply identification apparatus is incorporated is used in an external mode, according to the first embodiment of the present invention.

FIG. 2 is a pattern diagram illustrating a state of use in a mode such that the semiconductor memory card drive 110 is externally attached to the PC 100 (external mode). The semiconductor memory card drive 110 is independent from the PC 100. When the semiconductor memory card drive 110 is externally attached to the PC 100, a power is supplied to the semiconductor memory card drive 110 by the AC power. A power is supplied to the PC 100 from another AC power. The semiconductor memory card drive 110 is connected to the PC 100 via an USB cable and exchanges various data.

1.2. Configuration relating to Power Supply in Semiconductor Memory Card Drive

Figure 3:
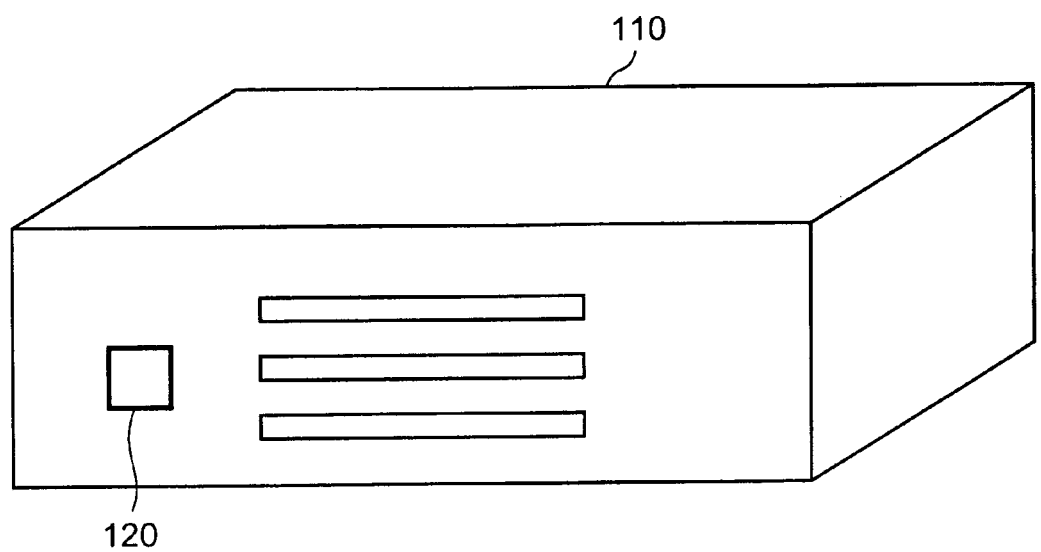
FIG. 3 is a perspective view where the semiconductor memory card drive into which the power supply identification apparatus is incorporated is viewed from a right front side, according to the first embodiment of the present invention.

FIG. 3 is a perspective view where the semiconductor memory card drive 110 according to the first embodiment is viewed from a front side. As shown in FIG. 3, the semiconductor memory card drive 110 has a power switch 120. When the semiconductor memory card drive 110 is used in the external mode, the power switch 120 is operated so that the semiconductor memory card drive 110 is activated. On the other hand, when the semiconductor memory card drive 110 is used in the built-in mode in the PC 100, the semiconductor memory card drive 110 is activated by supply of the ATX power supply regardless of the operation of the power switch 120.

Figure 4:
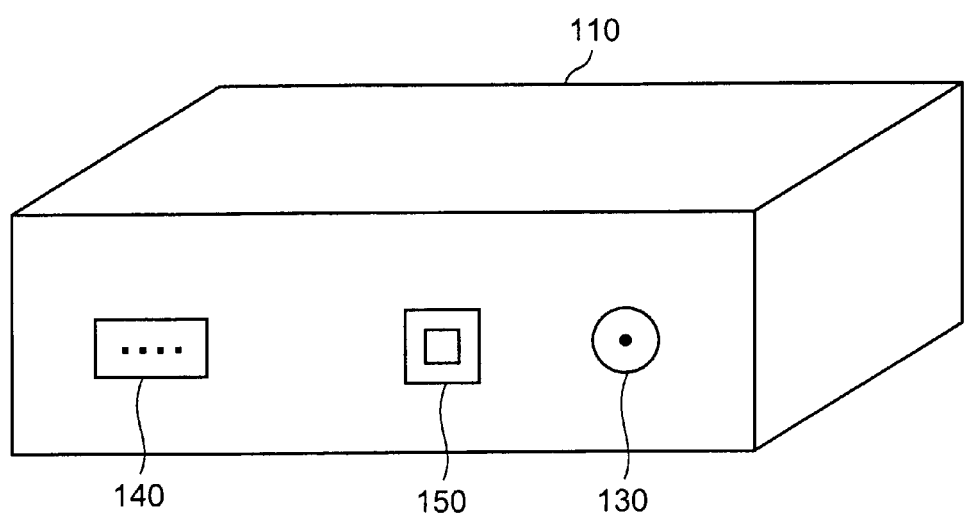
FIG. 4 is a perspective view where the semiconductor memory card drive into which the power supply identification apparatus is viewed from a right rear side, according to the first embodiment of the present invention.

FIG. 4 is a perspective view where the semiconductor memory card drive 110 according to the first embodiment is viewed from a rear side. A rear surface of the semiconductor memory card drive 110 is provided with a DC jack 130 to which the AC power is connected at the time of use in the external mode. Further, an ATX power terminal 140 to which an ATX power cable is connected from the PC 100 is provided in the use of the built-in mode in the PC 100. A USB terminal 150 to which the USB cable for exchanging data with the PC 100 at the time of the use in the external mode is connected is further provided.

1.3. Configuration of Power Supply Identification Apparatus

Figure 5:
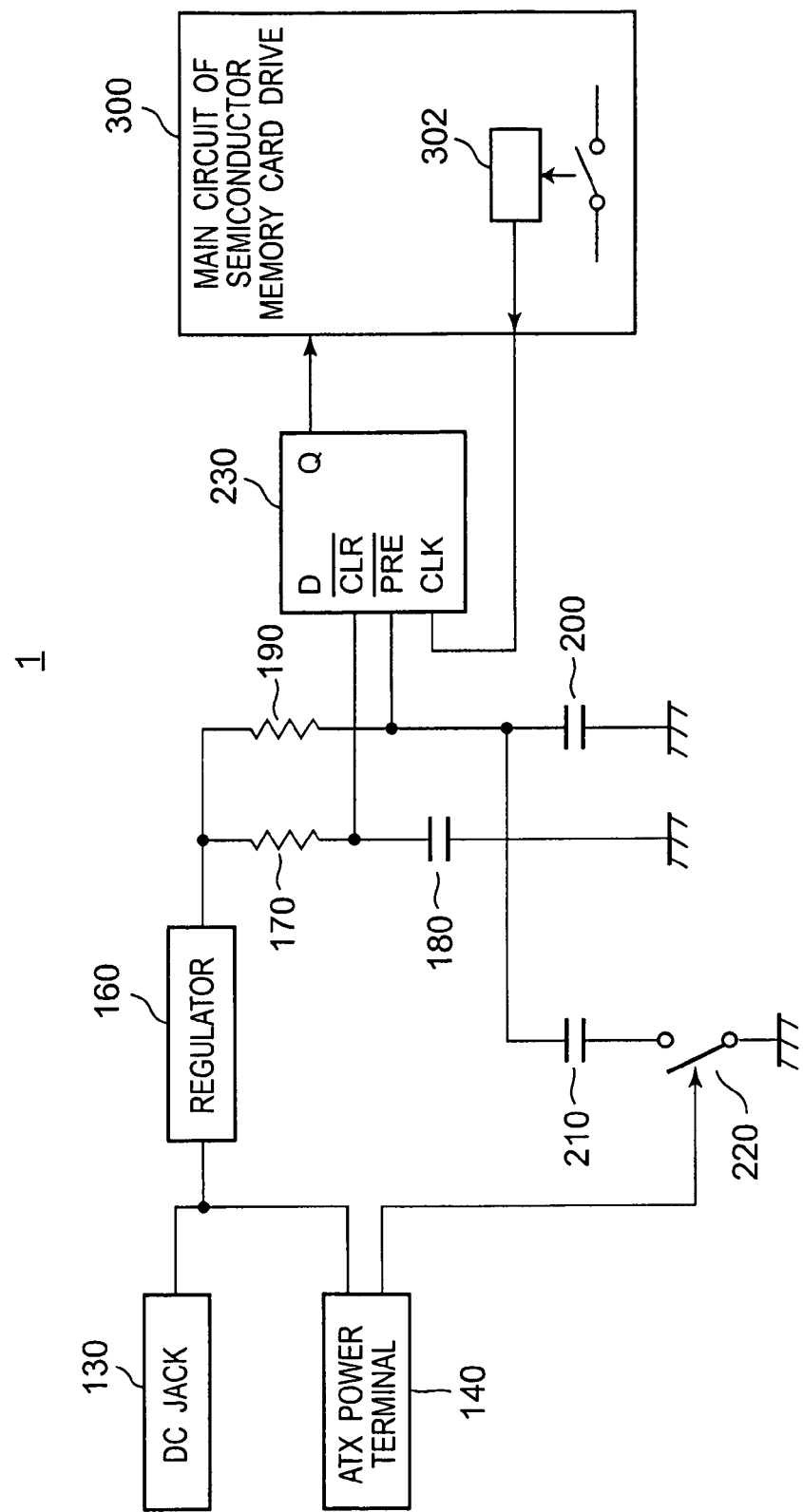
FIG. 5 is a circuit diagram illustrating the power supply identification apparatus into which the semiconductor memory card drive is incorporated, according to the first embodiment of the present invention.

FIG. 5 is a circuit diagram illustrating a power supply identification apparatus 1 to be incorporated into the semiconductor memory card drive 110 according to the first embodiment. The power is supplied to the power supply identification apparatus 1 according to the first embodiment via the DC jack 130 or the ATX power terminal 140, but as described later, different operations are performed in the respective cases.

The power supply identification apparatus 1 includes the DC jack 130, the ATX power terminal 140, a regulator 160, a first resistor 170, a first capacitor 180, a second resistor 190, a second capacitor 200, a third capacitor 210, a switch element 220, and a flip-flop 230.

In the power supply identification apparatus 1 shown in FIG. 5, voltages input into the DC jack 130 and the ATX power terminal 140 are input into the regulator 160. The first resistor 170 and the first capacitor 180 are serially connected to an output of the regulator 160, and one end of the first capacitor 180 is grounded (GND). Further, the second resistor 190 and the second capacitor 200 are serially connected to the output of the regulator 160, and one end of the second capacitor 200 is grounded (GND). That is to say, a series circuit of the first resistor 170 and the first capacitor 180 is connected with a series circuit of the second resistor 190 and the second capacitor 200 in parallel between the output of the regulator 160 and the ground (GND). The regulator 160 is for limiting so that an input voltage into the flip-flop 230 does not exceed its withstand voltage, and is not essential for the power supply identification apparatus 1.

The third capacitor 210 and the switch element 220 that are serially connected are provided in parallel with the second capacitor 200. One end of the switch element 220 is grounded (GND). The switch element 220 is an element including a transistor or the like that is turned on when a predetermined voltage is supplied from the outside, and the switch element 220 is connected to the ATX power terminal 140 so that the predetermined voltage is supplied from the ATX power terminal 140. Further, a node between the first resistor 170 and the first capacitor 180 is connected to a CLR terminal of the flip-flop 230, and a node between the second resistor 190, and the second capacitor 200 and the third capacitor 210 is connected to a PRE terminal of the flip-flop 230.

More specifically, a configuration of the power supply identification apparatus 1 will be described. The regulator 160 is input a voltage supplied from the DC jack 130 or the ATX power terminal 140 into, and outputs a constant output voltage obtained by dropping the input voltage. When the flip-flop 230 has a sufficient withstand voltage with respect to the input voltage from the DC jack 130, the regulator 160 may be omitted.

The flip-flop 230 has a low-active type CLR terminal (first input terminal) and a low-active type PRE terminal (second input terminal). The flip-flop 230 further has a CLK terminal and an output terminal Q. The flip-flop 230 outputs High (hereinafter, "H") or Low (hereinafter, "L") from the output terminal Q. A main circuit 300 of the semiconductor memory card drive 110 is connected to the output terminal Q.

That a Q output of the output terminal Q of the flip-flop 230 is "H" means that a voltage to be supplied to the main circuit 300 of the semiconductor memory card drive 110 is output. That the Q output of the flip-flop 230 is "L" means 0 output (a voltage of O V is output).

In the flip-flop 230 shown in FIG. 5, a line is drawn above the CLR terminal and the PRE terminal, and these lines represent that these terminals are operated in a Low-Active state. That is to say, when an "L" signal is input into the CLR terminal, the flip-flop 230 is cleared so that the output terminal Q outputs "L". When an "L" signal is input into the PRE terminal, the flip-flop 230 is preset so that the output terminal Q outputs "H".

When a signal is input into the PRE terminal and the CLR terminal of the flip-flop 230, the state of the flip-flop 230 is determined at the time of signal input. That is, in the flip-flop 230, when an "H" signal is input into the PRE terminal first, the CLR terminal becomes "L", and when an "H" signal is input into the CLR terminal, the PRE terminal becomes "L". Therefore, in the flip-flop 230, when an "H" signal is input into the PRE terminal first, the CLR terminal becomes "L", and the output terminal Q outputs "L". On the other hand, when an "H" signal is input into the CLR terminal first, the PRE terminal becomes "L", and the output terminal Q outputs "H".

In the first embodiment, the first resistor 170 and the first capacitor 180 form a first RC circuit having a first time constant $\alpha$. A resistance of the first resistor 170 may be, for example, 10 k$\Omega$, and a capacitance of the first capacitor 180 may be 0.01 µF. Further, the second resistor 190 and the second capacitor 200 form a second RC circuit having a second time constant $\beta$ smaller than the first time constant $\alpha$. A resistance of the second resistor 190 may be, for example, 10 k$\Omega$, and a capacitance of the second capacitor 200 may be 1000 pF.

In the first embodiment, when the switch element 220 is turned on, the third capacitor 210 is connected to the second capacitor 200 in parallel in the second RC circuit. As a result, the time constant of the second RC circuit is changed into a third time constant $\beta'$ larger than the first time constant $\alpha$. That is to say, when the switch element 220 is turned on, the time constant of the second RC circuit is switched from the second time constant $\beta$ into the third time constant $\beta'$. The switch element 220 is configurated so as to be turned on when a power is supplied from the ATX power terminal 140. The switch element 220 may be FET or the like. Further, the capacitance of the third capacitor 210 is, for example, 0.1 µF.

In the first embodiment, the resistances and the capacitances of the first resistor 170, the second resistor 190, the first capacitor 180, the second capacitor 200, and the third capacitor 210 have the above values, but may have any values as long as the first time constant $\alpha$, the second time constant $\beta$ and the third time constant $\beta'$ satisfy a relationship that $\beta<\alpha<\beta'$.

1.4. Operation of Power Supply Identification Apparatus

An operation of the power supply identification apparatus 1 of the semiconductor memory card drive 110 having the above configuration according to the first embodiment will be described.

1.4.1. Operation in External Mode

Figure 6:
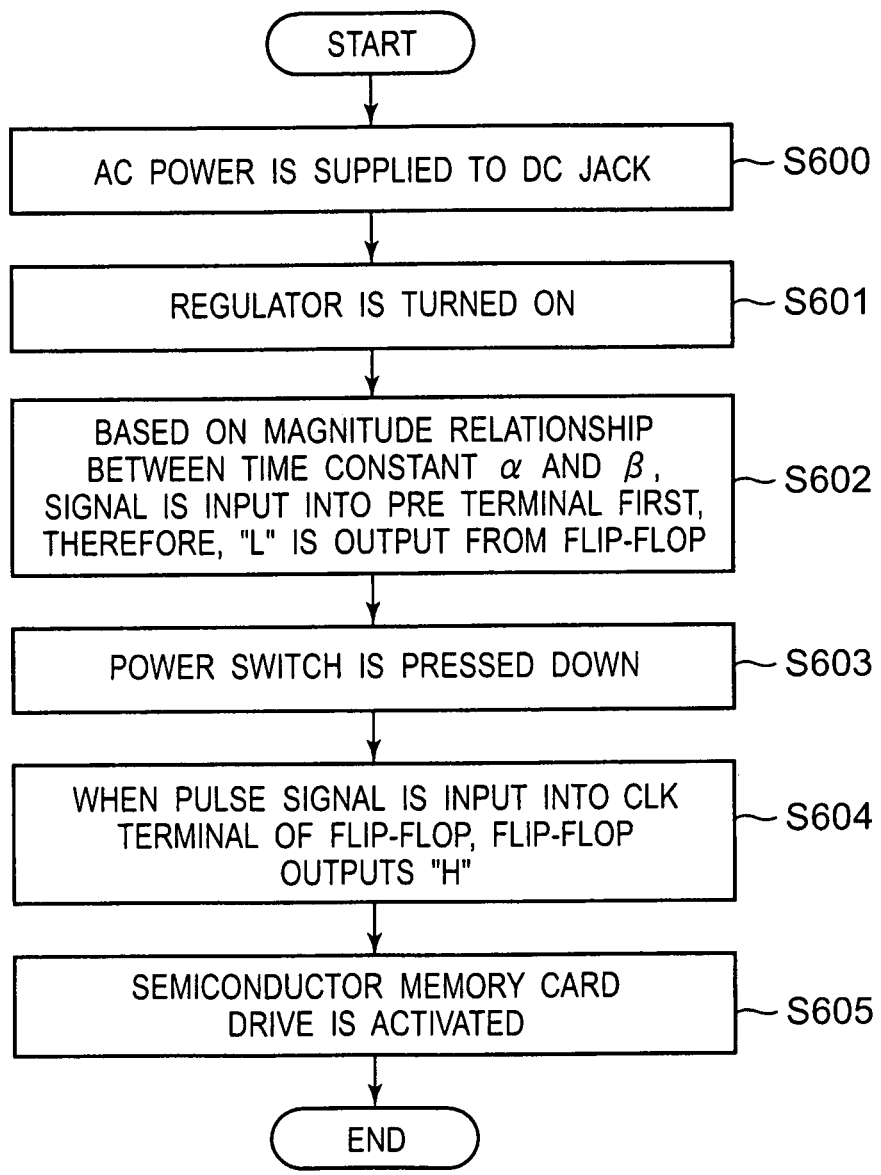
FIG. 6 is a diagram describing a flow of an activating operation in a case where a power is supplied to the semiconductor memory card drive from a DC jack, according to the first embodiment of the present invention.

FIG. 6 is a diagram describing a flow of the activating operation in the case where the power is supplied to the semiconductor memory card drive 110 from the DC jack 130 according to the first embodiment (namely, in the external mode).

An AC power cable is connected to the DC jack 130 of the semiconductor memory card drive 110, and the AC power is supplied thereto (S600). As a result, the regulator 160 is turned on (S601), and a predetermined voltage is supplied to the flip-flop 230. At this time, an input timing of the "H" signal input into the CLR terminal is determined by the first time constant $\alpha$ of the first RC circuit formed by the first resistor 170 and the first capacitor 180. On the other hand, the input timing of the "H" signal input into the PRE terminal is determined by the second time constant $\beta$ of the second RC circuit formed by the second resistor 190 and the second capacitor 200. Since the first time constant $\alpha$ and the second time constant $\beta$ satisfy a relationship that $\beta<\alpha$, the "H" signal is input into the PRE terminal of the flip-flop 230 first. Therefore, "L" is output from the output terminal Q of the flip-flop 230 (S602). Since the Q output from the output terminal Q is "L", a driving voltage to the main circuit 300 of the semiconductor memory card drive is 0 V, and thus an initial state of the semiconductor memory card drive 110 is in a power-off state.

When the AC power is supplied to the semiconductor memory card drive 110, the power of the semiconductor memory card drive 110 is brought into the OFF state by the operation of the power supply identification apparatus 1 just after the supply of the AC power.

Thereafter, when the power switch 120 of the semiconductor memory card drive 110 is pressed down (S603), a detecting section 302 for detecting the ON/OFF state of the power switch 120 in the main circuit 300 of the semiconductor memory card drive generates a pulse signal. The pulse signal is input into the CLK terminal of the flip-flop 230. When the pulse signal is input into the CLK terminal, the flip-flop 230 switches the Q output from the output terminal Q from "L" into a voltage "H" output from the regulator 160 (S604). As a result, a driving voltage is supplied to the main circuit 300 of the semiconductor memory card drive 110, and the semiconductor memory card drive 110 is activated (S605).

The semiconductor memory card drive 110 is in the power-off state just after the supply of the AC power, but when the power switch 120 is pressed down, the power is turned ON, and the device is activated.

1.4.2. Operation in Built-In Mode

Figure 7:
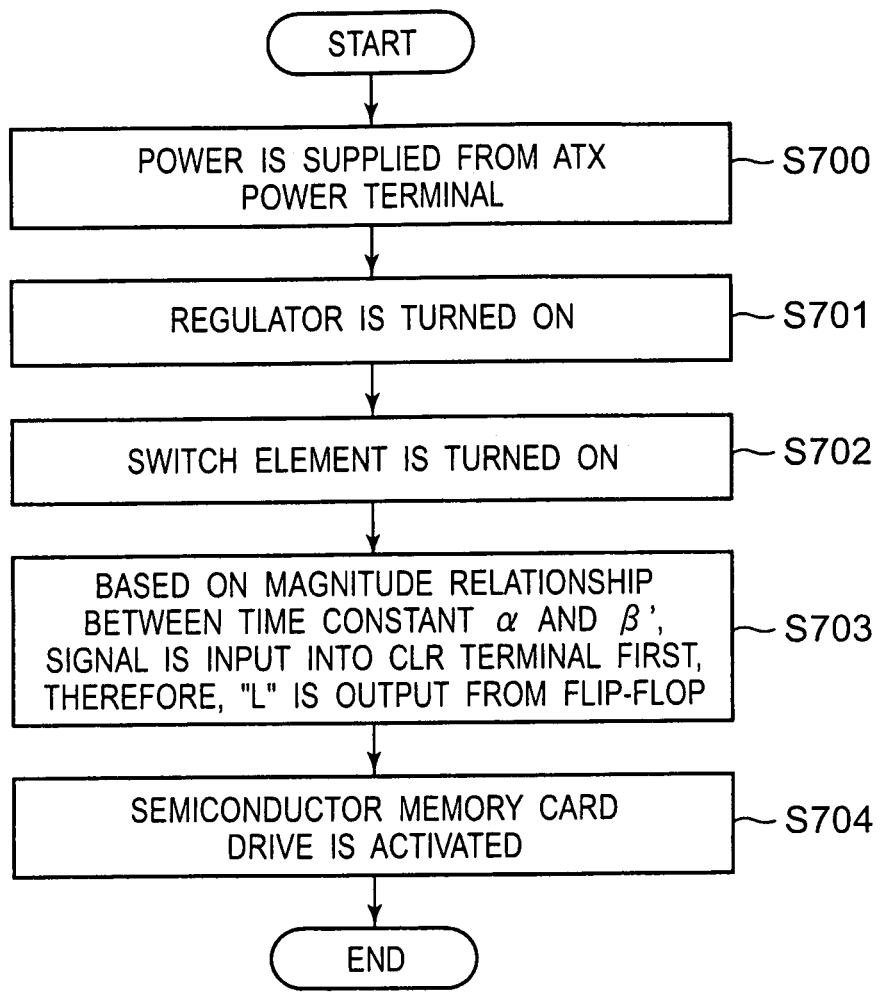
FIG. 7 is a diagram describing a flow of the activating operation in a case where a power is supplied to the semiconductor memory card drive from an ATX power terminal, according to the first embodiment of the present invention.

An operation in the case where a power is supplied to the semiconductor memory card drive 110 according to the first embodiment from the ATX power terminal 140 (namely, in the built-in mode) will be described with reference to FIG. 7.

When the PC 100 is powered on in a state that the ATX power cable from the PC 100 is connected to the ATX power terminal 140, a supply voltage is supplied via the ATX power terminal 140 to the semiconductor memory card drive 110 (S700). When the supply voltage is supplied via the ATX power terminal 140, the regulator 160 is turned on (S701), and a predetermined voltage is supplied to the flip-flop 230. At this time, the switch element 220 is turned on by the voltage of the ATX power terminal 140 (S702), and the third capacitor 210 is connected to the second capacitor 200 in parallel.

At this time, the input timing of the "H" signal input into the CLR terminal is determined by the first time constant α of the first RC circuit formed by the first resistor 170 and the first capacitor 180. On the other hand, the input timing of the "H" signal input into the PRE terminal is determined by the third time constant β' of the second RC circuit formed by the second resistor 190, the second capacitor 200 and the third capacitor 210. Since the first time constant α and the third time constant β' satisfy a relationship that a<β', an "H" signal is input into the CLR terminal of the flip-flop 230 first. Therefore, "H" is output from the output terminal Q of the flip-flop 230 (S703). As a result, a driving voltage is supplied to the main circuit 300 of the semiconductor memory card drive, and the semiconductor memory card drive 110 is activated (S704).

When the ATX power is supplied to the semiconductor memory card drive 110, the semiconductor memory card drive 110 is powered on in the initial state by the operation of the power supply identification apparatus 1.

1.5. Conclusion

In the power supply identification apparatus 1 according to the first embodiment, the AC power is connected to the DC jack 130 or the ATX power is connected to the ATX power terminal 140, so that a relationship between the time constant of the first RC circuit connected to the CLR terminal of the flip-flop 230 and the one of the second RC circuit connected to the PRE terminal is changed. When the relationship between the time constant of the first RC circuit and the one of the second RC circuit is changed, a relationship between the input timing of the "H" signal to be input into the CLR terminal of the flip-flop 230 and the one of the "H" signal to be input into the PRE terminal is changed.

When the relationship between the input timing of the "H" signal to be input into the CLR terminal and the one of the "H" signal to be input into the PRE terminal is changed, the power supply identification apparatus 1 according to the first embodiment controls the initial ON/OFF state of the semiconductor memory card drive 110 according to whether a power is supplied via one of or the other one of the two kinds of the power input terminals (the DC jack 130 and the ATX power terminal 140) of the semiconductor memory card drive 110.

Second Embodiment 2.1. Configuration of Power Supply Identification Apparatus

Figure 8:
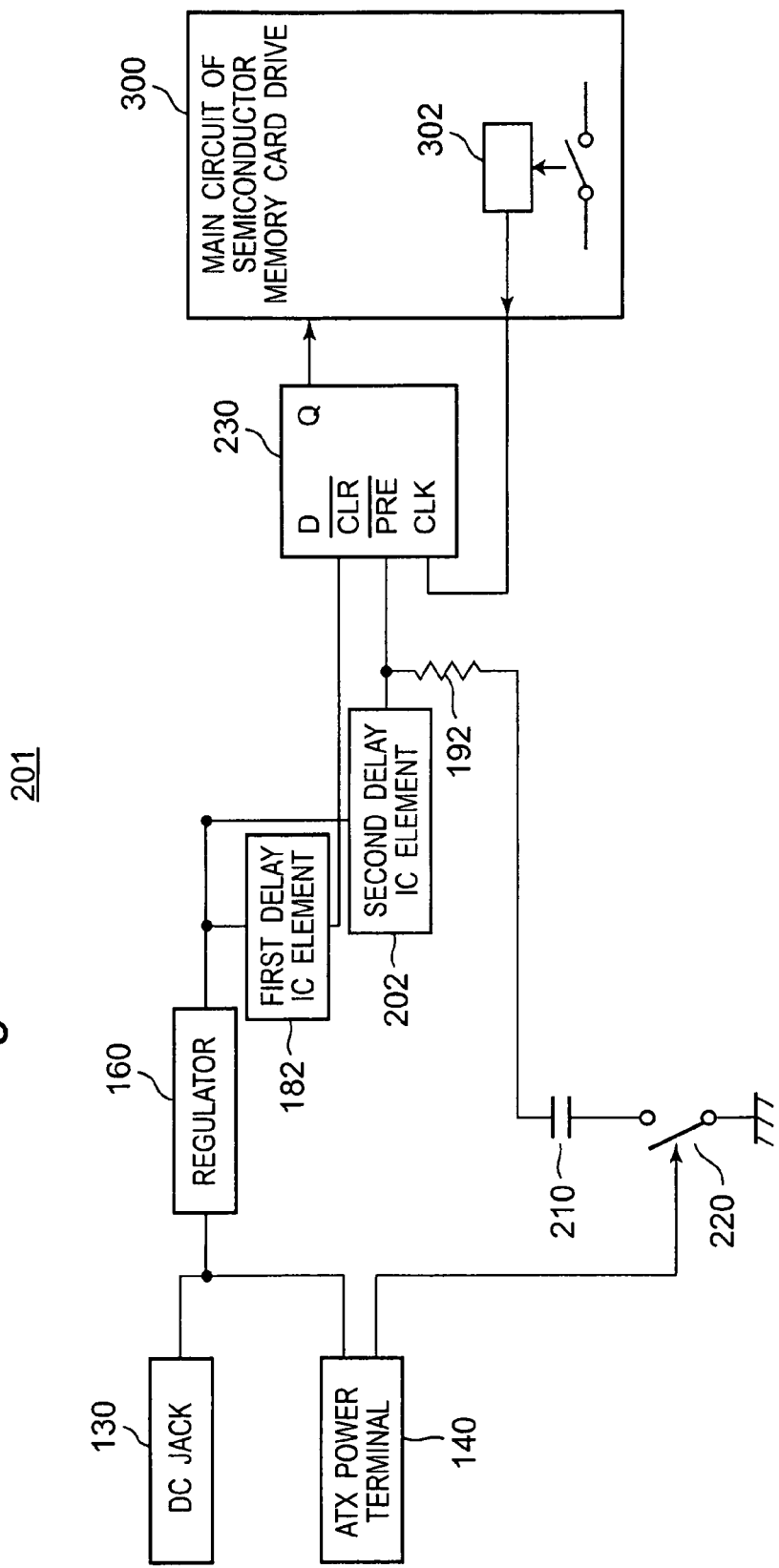
FIG. 8 is a circuit diagram illustrating the power supply identification apparatus incorporated into the semiconductor memory card drive, according to a second embodiment of the present invention.

FIG. 8 is a circuit diagram illustrating a power supply identification apparatus 201 to be incorporated into the semiconductor memory card drive 110 according to a second embodiment of the present invention. The power supply identification apparatus 201 according to the second embodiment has a configuration approximately similar to that of the power supply identification apparatus 1 according to the first embodiment, and performs the similar operation. Therefore, like members are denoted by like reference symbols and the description thereof is omitted, and a difference between both of them will be mainly described.

In the power supply identification apparatus 201 according to the second embodiment, a first delay IC element 182 is provided instead of the first resistor 170 and the first capacitor 180 in the power supply identification apparatus 1 according to the first embodiment. A second delay IC element 202 is provided instead of the second resistor 190 and the second capacitor 200. Further, a third resistor 192, the third capacitor 210 and the switch element 220 are serially connected to an output of the second delay IC element 202. One end of the switch element 220 is grounded (GND).

The first delay IC element 182 is a delay element for delaying a voltage to be input by a first delay time t1 so as to output the voltage. Similarly, the second delay IC element 202 is a delay element for delaying a voltage to be input by a second delay time t2 so a to output the voltage. Therefore, the first delay IC element 182 delays an output voltage from the regulator 160 by the first delay time t1 so as to input the voltage into the CLR terminal of the flip-flop 230. The second delay IC element 202 delays the output voltage from the regulator 160 by the second delay time t2 so as to input the voltage to the PRE terminal of the flip-flop 230. In the power supply identification apparatus 201 according to the second embodiment, the delay times are set in the respective delay IC elements so that t2<t1.

When the switch element 220 is closed (ON), the third resistor 192 and the third capacitor 210 form the RC circuit having a fourth time constant γ. Since the third resistor 192 and the third capacitor 210 have the fourth time constant γ, a voltage to be input is delayed by a predetermined delay time (hereinafter, a third delay time t3) so as to be output.

As a result, in the power supply identification apparatus 201 according to the second embodiment, when the switch element 220 is closed (ON), the output voltage of the regulator 160 is delayed by a sum of the second delay time t2 and the third delay time t3 (t2+t3) by the second delay IC element 202, the third resistor 192 and the third capacitor 210 so as to be input into the PRE terminal of the flip-flop 230. At this time, the output voltage from the regulator 160 is delayed by the first delay time t1 by the first delay IC element 182 so as to be input into the CLR terminal of the flip-flop 230.

In the power supply identification apparatus 201 according to the second embodiment, the delay times in the respective delay IC elements and the fourth time constant γ are set so that "t1<t2+t3".

2.2. Operation of Power Supply Identification Apparatus

An operation of the power supply identification apparatus 201 of the semiconductor memory card drive 110 having the above configuration according to the second embodiment will be described.

2.2.1. Operation in External Mode

When the AC power cable is connected to the DC jack 130 of the semiconductor memory card drive 110 and the AC power is supplied, the input timing of the "H" signal input into the CLR terminal is determined by the first delay time t1 obtained by the first delay IC element 182. On the other hand, the input timing of the "H" signal input into the PRE terminal is determined by the second delay time t2 obtained by the second delay IC element 202. Since the first delay time t1 and the second delay time t2 satisfy a relationship that t2<t1, the "H" signal is input into the PRE terminal of the flip-flop 230 first. Therefore, "L" is output from the output terminal Q of the flip-flop 230. Since the Q output from the output terminal Q is "L", the driving voltage to be supplied to the main circuit 300 of the semiconductor memory card drive is 0 V, and thus the initial state of the semiconductor memory card drive 110 is in a power-off state.

Thereafter, when the power switch 120 of the semiconductor memory card drive 110 is pressed down, a pulse signal is input into the CLK terminal of the flip-flop 230, and thus the Q output from the output terminal Q of the flip-flop 230 is switched from "L" into a voltage "H" output from the regulator 160. As a result, the driving voltage is supplied to the main circuit 300 of the semiconductor memory card drive 110, and the semiconductor memory card drive is actuated.

2.2.2. Operation in Built-In Mode

When the ATX power cable is connected to the ATX power terminal 140 of the semiconductor memory card drive 110 and a power from the PC 100 is supplied, the input timing of the "H" signal to be input into the CLR terminal is determined by the first delay time t1 obtained by the first delay IC element 182. On the other hand, when the supply voltage is supplied from the ATX power terminal 140 and the switch element 220 is turned on, the input timing of the "H" signal to be input into the PRE terminal is determined by the sum of the second delay time t2 and the third delay time t3 (t2+t3) obtained by the second delay IC element 202, the third resistor 192 and the third capacitor 210. Since the first delay time t1, the second delay time t2 and the third delay time t3 satisfy a relationship that t1<t2+t3, the "H" signal is input into the CLR terminal of the flip-flop 230 first. Therefore, "H" is output from the output terminal Q of the flip-flop 230, and thus the driving voltage is supplied to the main circuit 300 of the semiconductor memory card drive, so that the semiconductor memory card drive 110 is actuated.

2.3. Conclusion

In the power supply identification apparatus 201 according to the second embodiment, the relationship between the delay time in the first delay element connected to the CLR terminal of the flip-flop 230 and the one in the second delay element connected to the PRE terminal, respectively, is changed according to whether the AC power is connected to the DC jack 130 or the ATX power is connected to the ATX power terminal 140. When the relationship between the delay time in the first delay element and the one in the second delay element is changed, a relationship between the input timing of the "H" signal to be input into the CLR terminal of the flip-flop 230 and the one of the "H" signal to be input into the PRE terminal is changed.

When the relationship between the input timing of the "H" signal to be input into the CLR terminal and the one of the "H" signal to be input into the PRE terminal is changed, the power supply identification apparatus 201 according to the second embodiment controls the initial ON/OFF state of the semiconductor memory card drive 110 according to whether a power is supplied via one of or the other one of the two kinds of power terminals (the DC jack 130 and the ATX power terminal 140) of the semiconductor memory card drive 110.

Third Embodiment 3.1. Configurations of Power Supply Identification Apparatus and Q Output Determining Section In the flip-flop 230 in the power supply identification apparatus according to the first embodiment shown in FIG. 5 and the second embodiment shown in FIG. 8, that the Q output of the output terminal Q is "H" means that a voltage to be supplied to the main circuit 300 of the semiconductor memory card drive 110 is output, and that the Q output of the output terminal Q of the flip-flop 230 is "L" means 0 output. The idea of the present invention could be realized in other circuits than such circuit where the output terminal Q of the flip-flop 230 outputs such "H" (namely, the predetermined voltage) and such "L" (namely, the voltage of 0 V).

That is to say, when the output terminal Q of the flip-flop 230 selectively outputs a voltage larger than a predetermined threshold and a voltage smaller than the predetermined threshold, the power supply identification apparatus according to the third embodiment described below can realize the idea of the present invention.

FIG. 9(1) is a circuit diagram illustrating a power supply identification apparatus 1' to be incorporated into the semiconductor memory card drive 110 according to a third embodiment of the present invention. The power supply identification apparatus 1' according to the third embodiment shown in FIG. 9(1) is configured so that a Q output determining section 304 for determining the Q output of the flip-flop 230 is provided to the power supply identification apparatus 1 according to the first embodiment shown in FIG. 5. The Q output from the output terminal Q of the flip-flop 230, and the voltage from the DC jack 130 or the ATX power terminal 140 are input into the Q output determining section 304. As to the other parts of the configuration and the operation, the power supply identification apparatus 1' according to the third embodiment has the configuration similar to the power supply identification apparatus 1 according to the first embodiment, and performs the similar operation. Therefore, the configuration and the operation of the Q output determining section 304 will be mainly described below.

The Q output determining section 304 of the power supply identification apparatus 1' according to the third embodiment shown in FIG. 9(1) includes an N-channel type first FET 310, a P-channel type second FET 320, a fourth resistor 330, and a fifth resistor 340.

The Q output of the flip-flop 230 in the power supply identification apparatus 1' according to the third embodiment is connected to a gate of the first FET 310. The fourth resistor 330, the fifth resistor 340, and the first FET 310 are serially connected between the output of the DC jack 130 or the ATX power terminal 140 and the ground (GND). The first FET 310 is arranged so that a drain of the first FET 310 is connected to one end of the fifth resistor 340, and a source of the first FET 310 is grounded (GND).

The second FET 320 is arranged so that a node between the fourth resistor 330 and the fifth resistor 340 is connected to a gate of the second FET 320, and the output of the DC jack 130 or the ATX power terminal 140 is connected to a source of the second FET 320, and a drain of the second FET 320 is connected to the main circuit 300 of the semiconductor memory card drive. The second FET 320 is an element for conducting or shutting off the power supply from the DC jack 130 or the ATX power terminal 140 with or from the main circuit 300 of the semiconductor memory card drive.

The N-channel type first FET 310 is configurated so that when a gate-source voltage is higher than the predetermined threshold (a first threshold), the drain and the source are conducted to each other, and when the gate-source voltage is lower than the first threshold, the drain and the source are not conducted to each other. Accordingly, when outputting "H" as the Q output, the output terminal Q of the flip-flop 230 outputs the voltage higher than the first threshold, and when outputting "L" as the Q output, the output terminal Q outputs the voltage lower than the first threshold.

Further, the P-channel type second FET 320 is configurated so that when the source-gate voltage is higher than another predetermined threshold (a second threshold), the source and the drain are conducted to each other, and when the source-gate voltage is lower than the second threshold, the source and the drain are not conducted to each other. Accordingly, when the source and the drain of the first FET 310 are conducted to each other, an output voltage from the DC jack 130 or the ATX power terminal 140 is applied to the fourth resistor 330 and the fifth resistor 340. Therefore, a divided voltage from the fourth resistor 330 in the fourth resistor 330 and the fifth resistor 340 is applied between the gate and the source of the second FET 320. Further, the divided voltage obtained by this resistance voltage division becomes larger than the second threshold.

3.2. Operation of Power Supply Identification Apparatus and Q Output Determining Section An operation of the Q output determining section 304 of the power supply identification apparatus 1' having the above configuration according to the third embodiment will be described.

3.2.1. In the Case where the Q Output from the Output Terminal Q of the Flip-Flop is "H"

Due to the "H" voltage in this case, a voltage higher than the first threshold is applied between the gate and the source of the first FET 310. At this time, the drain and the source of the first FET 310 are conducted to each other. Due to this conduction, a divided voltage of the fourth resistor 330 in the fourth resistor 330 and the fifth resistor 340 in the output voltage from the DC jack 130 or the ATX power terminal 140 is applied between the source and the gate of the second FET 320. The voltage obtained by dividing resistance is larger than the second threshold, and thus the source and the drain of the second FET 320 are conducted to each other. As a result, the supply voltage of the DC jack 130 or the ATX power terminal 140 is supplied to the main circuit 300 of the semiconductor memory card drive.

In the power supply identification apparatus 1' according to the third embodiment, when the output terminal Q of the flip-flop 230 outputs a voltage higher than the threshold voltage for turning on the first FET 310 as the "H" voltage, the supply voltage from the DC jack 130 or the ATX power terminal 140 is supplied to the main circuit 300 of the semiconductor memory card drive.

That the Q output from the output terminal Q of the flip-flop is "H" in the initial state means that the supply voltage from the ATX power terminal 140 is supplied to the power supply identification apparatus 1' as described in the first and second embodiments. For this reason, the supply voltage from the ATX power terminal 140 is supplied to the main circuit 300 of the semiconductor memory card drive.

3.2.2. In the Case where the Q Output from the Flip-Flop is "L".

Due to the "L" voltage in this case, a voltage lower than the first threshold is applied between the gate and the source as described above. At this time, the source and the drain are not conducted to each other. As a result, a voltage drop does not occur in the fourth resistor 330, and thus no voltage is applied between the source and the gate of the second FET 320. At this time, the source and the drain of the second FET 320 are not conducted to each other, and no voltage is supplied to the main circuit 300 of the semiconductor memory card drive.

In the power supply identification apparatus 1' according to the third embodiment, when the output terminal Q of the flip-flop 230 outputs a voltage lower than the threshold voltage for turning on the first FET 310 as the "L" voltage, the supply voltage from the DC jack 130 or the ATX power terminal 140 is not supplied to the main circuit 300 of the semiconductor memory card drive. The "L" voltage may be lower than the threshold voltage for turning on the first FET 310, and thus is not always 0 V.

That the Q output from the output terminal Q of the flip-flop is "L" in the initial state means that the supply voltage is supplied from the DC jack 130 to the power supply identification apparatus 1' as described in the first and seconds embodiments.

Thereafter, when the power switch 120 of the semiconductor memory card drive 110 is pressed down, the detecting section 302 for detecting the ON/OFF state of the power switch 120 generates a pulse signal in the main circuit 300 of the semiconductor memory card drive. This pulse signal is input into the CLK terminal of the flip-flop 230. When the pulse signal is input into the CLK terminal, the flip-flop 230 switches the Q output via the output terminal Q from "L" into "H". As a result, the supply voltage is supplied to the main circuit 300 of the semiconductor memory card drive.

3.3. Conclusion

In the third embodiment, the Q output determining section 304 is provided to the power supply identification apparatus 1'. The Q output determining section 304 outputs or does not output the supply voltage according to the relationship between the voltage of the Q output and the first threshold. The power supply identification apparatus 1' has the flip-flop 230 for outputting the "H" voltage or the "L" voltage as the Q output according to the relationship between the timing of the "H" signal to be input into the CLR terminal of the flip-flop 230 and the one of the "H" signal to be input into the PRE terminal. As a result, the voltage output from the output terminal Q of the flip-flop 230 does not have to be limited to 0 V or the voltages of two predetermined values.

Like a power supply identification apparatus 201' shown in FIG. 9(2), also when the Q output determining section 304 is provided to the power supply identification apparatus 201 according to the second embodiment shown in FIG. 8, an effect and an advantage that are similar to those of the power supply identification apparatus 1' shown in FIG. 9(1) can be obtained.

FET does not have to be always used as the first FET 310 and the second FET 320 in the Q output determining section 304, and a transistor or LSI can also configurate the Q output determining section according to the third embodiment.

Another Embodiment

The technical idea of the present invention is not realized only by the above first to third embodiments, and can be realized by another various embodiments.

For example, in the power supply identification apparatus 201 according to the second embodiment, the third resistor 192, the third capacitor 210 and the switch element 220 are provided, but instead of them, a second switch element and a third delay IC element for delaying a signal by the third delay time t3 may be connected in parallel between the output of the second delay IC element 202 and the PRE terminal of the flip-flop 230. In this case, when the AC power cable is connected to the DC jack 130 and the AC power is supplied, the second switch element is turned on and an electric current flows via the second switch element, but simultaneously an electric current does not flow in the third delay IC element. When the ATX power cable is connected to the ATX power terminal 140 and a power from the PC is supplied, the second switch element is turned off and an electric current does not flow via the second switch element, but simultaneously an electric current flows in the third delay IC element. Even such a configuration can produce the effect and the advantage similar to those of the power supply identification apparatus 201 according to the second embodiment.

The power supply identification apparatus according to the embodiments is useful because it can control an output state according to whether a power is supplied from one or the other one of the two kinds of the supply terminals and can be incorporated into various electronic devices.

What is claimed is:

1. A power supply identification apparatus, comprising:
   a first power terminal to which a first power supply is connected;
   a second power terminal to which a second power supply is connected;
   an output terminal;
   a voltage switching section having a first input terminal and a second input terminal, the voltage switching section for switching an output voltage of the output terminal into a first voltage representing that the first power supply is connected to the first power terminal or a second voltage representing that the second power supply is connected to the second power terminal according to an input order of signals into the first input terminal and the second input terminal;
   a first delay section for delaying the voltage supplied via the first power terminal or the second power terminal by a first delay time so as to output the voltage to the first input terminal;
   a second delay section for delaying the voltage supplied via the first power terminal or the second power terminal by a second delay time shorter than the first delay time so as to output the voltage to the second input terminal; and
   a delay time switching section for switching the second delay time into a third delay time longer than the first delay time based on the power supply to the second power terminal.

2. The power supply identification apparatus according to claim 1, wherein
   the first delay section delays the voltage supplied via the first power terminal or the second power terminal according to a first time constant so as to output the voltage to the first input terminal,
   the second delay section delays the voltage supplied via the first power terminal or the second power terminal according to a second time constant smaller than the first time constant so as to output the voltage to the second input terminal,
   the delay time switching section switches the second time constant into a third time constant larger than the first time constant based on the power supply to the second power terminal so as to switch the second delay time into a third delay time longer than the first delay time.

3. The power supply identification apparatus according to claim 1, further comprising a circuit for outputting a control signal for making a control so that the output voltage of the output terminal is switched from the first voltage into the second voltage to the voltage switching section.

4. The power supply identification apparatus according to claim 1, further comprising:
   a voltage dropping section for dropping the voltages supplied from the first power terminal and the second power terminal,
   wherein the voltage switching section outputs a voltage output from the voltage dropping section instead of the voltage supplied via the second power terminal or the first power terminal.

5. A power supply identification method in a power supply apparatus having a first power terminal to which a first power supply is connected, a second power terminal to which a second power supply is connected, and an output terminal, the method comprising:
   delaying a voltage supplied via the first power terminal or the second power terminal by a first delay time so as to output the voltage to a first input terminal;
   delaying a voltage supplied via the first power terminal or the second power terminal by a second delay time shorter than the first delay time so as to output the voltage to a second input terminal,
   switching an output voltage of the output terminal into a first voltage representing that the first power supply is connected to the first power terminal or a second voltage representing that the second power supply is connected to the second power terminal according to an input order of the signals into the first input terminal and the second input terminal; and
   switching the second delay time into a third delay time longer than the first delay time based on the power supply to the second power terminal.

6. The power supply identification method according to claim 5, wherein
   at delaying by the first delay time, the voltage supplied via the first power terminal or the second power terminal is delayed according to a first time constant so as to be output into the first input terminal,
   at delaying by the second delay time, the voltage supplied via the first power terminal or the second power terminal is delayed according to the second time constant smaller than the first time constant so as to be output into the second input terminal,
   at switching the second delay time into the third delay time longer, the second time constant is switched into a third time constant larger than the first time constant based on the power supply to the second power terminal, so that the second delay time is switched into a third delay time longer than the first delay time.

7. The power supply identification method according to claim 5, wherein said switching the output voltage of the output terminal includes outputting a control signal for making a control so that the output voltage of the output terminal is switched from the first voltage into the second voltage.

8. The power supply identification method according to claim 5, further comprising:
   dropping the voltage supplied from the first power terminal and the second power terminal,
   wherein in said switching the output voltage of the output terminal, the dropped voltage in said dropping is output instead of the voltage supplied via the second power terminal or the first power terminal.

* * * * *